United States Patent
Bettis et al.

(10) Patent No.: US 9,367,929 B2
(45) Date of Patent: Jun. 14, 2016

(54) MONITORING WEB SITE CONTENT

(71) Applicant: Amazon Technologies, Inc., Reno, NV (US)

(72) Inventors: David William Bettis, Seattle, WA (US); Jonathan A. Jenkins, Seattle, WA (US); Sunbir Gill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/165,343

(22) Filed: Jan. 27, 2014

(65) Prior Publication Data

US 2014/0139544 A1 May 22, 2014

Related U.S. Application Data

(63) Continuation of application No. 13/006,281, filed on Jan. 13, 2011, now Pat. No. 8,667,127, which is a continuation of application No. 12/410,251, filed on Mar. 24, 2009, now Pat. No. 7,917,618.

(51) Int. Cl.
*G06F 15/173* (2006.01)
*G06T 7/40* (2006.01)
*G06F 17/30* (2006.01)
*G06T 7/00* (2006.01)

(52) U.S. Cl.
CPC .............. *G06T 7/40* (2013.01); *G06F 17/3089* (2013.01); *G06T 7/0002* (2013.01); *G06T 2207/30168* (2013.01)

(58) Field of Classification Search
CPC ................... G06T 2207/30168; G06T 7/0002
USPC ........................................................ 709/224
See application file for complete search history.

(56) References Cited

U.S. PATENT DOCUMENTS

| | | | |
|---|---|---|---|
| 5,649,185 A | 7/1997 | Antognini et al. | |
| 5,664,106 A | 9/1997 | Caccavale | |
| 5,819,033 A | 10/1998 | Caccavale | |
| 5,832,517 A | 11/1998 | Knutsen, II | |

(Continued)

OTHER PUBLICATIONS

Arcelli et al, "A New Technique for Image Magnification", p. 53-61, 2009.*

(Continued)

*Primary Examiner* — Karen Tang
(74) *Attorney, Agent, or Firm* — Knobbe Martens Olson & Bear LLP

(57) ABSTRACT

Systems and methods for monitoring Web page content associated with processing a resource request are provided. A client computing device generates a sample image corresponding to a set of resources rendered in response to a resource request. A processing component, such as an image analysis component, then compares the sample image with an averaged reference image to identify a compared image. The averaged reference image is determined from averaging a pixel intensity value for each pixel in a first reference image with a pixel intensity value for each pixel in a second reference image. These first and second reference images both correspond to the same set of requested resources. The processing component then weights the compared image to produce a weighted compared image and determines whether a sum of the intensity values for each pixel in the weighted compared image exceeds a threshold. Aspects of systems and methods for generating an alert message if the threshold is exceeded are also provided.

19 Claims, 8 Drawing Sheets

(56) References Cited

U.S. PATENT DOCUMENTS

| | | |
|---|---|---|
| 5,999,636 A * | 12/1999 | Juang .................... 382/112 |
| 6,182,125 B1 | 1/2001 | Borella et al. |
| 6,185,598 B1 | 2/2001 | Farber et al. |
| 6,243,761 B1 | 6/2001 | Mogul et al. |
| 6,377,257 B1 | 4/2002 | Borrel et al. |
| 6,438,592 B1 | 8/2002 | Killian |
| 6,473,804 B1 | 10/2002 | Kaiser et al. |
| 6,529,910 B1 | 3/2003 | Fleskes |
| 6,553,419 B1 | 4/2003 | Ram |
| 6,633,324 B2 | 10/2003 | Stephens, Jr. |
| 6,697,805 B1 | 2/2004 | Choquier et al. |
| 6,698,013 B1 | 2/2004 | Bertero et al. |
| 6,732,119 B2 * | 5/2004 | Ganapathy et al. |
| 6,978,418 B1 | 12/2005 | Bain et al. |
| 7,009,943 B2 | 3/2006 | O'Neil |
| 7,065,496 B2 | 6/2006 | Subbloie et al. |
| 7,085,825 B1 | 8/2006 | Pishevar et al. |
| 7,096,193 B1 | 8/2006 | Beaudoin et al. |
| 7,107,273 B2 | 9/2006 | Ohata et al. |
| 7,114,160 B2 | 9/2006 | Suryanarayana et al. |
| 7,120,871 B1 | 10/2006 | Harrington |
| 7,185,084 B2 | 2/2007 | Sirivara et al. |
| 7,269,657 B1 | 9/2007 | Alexander et al. |
| 7,343,399 B2 | 3/2008 | Hayball et al. |
| 7,523,181 B2 | 4/2009 | Swildens et al. |
| 7,555,542 B1 | 6/2009 | Ayers et al. |
| 7,581,224 B2 | 8/2009 | Romero |
| 7,596,150 B2 | 9/2009 | Baird et al. |
| 7,623,460 B2 | 11/2009 | Miyazaki |
| 7,650,376 B1 | 1/2010 | Blumenau |
| 7,653,725 B2 | 1/2010 | Yahiro et al. |
| 7,676,570 B2 | 3/2010 | Levy et al. |
| 7,685,270 B1 | 3/2010 | Vermeulen et al. |
| 7,685,273 B1 | 3/2010 | Anastas et al. |
| 7,698,418 B2 | 4/2010 | Shimada et al. |
| 7,707,071 B2 | 4/2010 | Rigole |
| 7,707,173 B2 | 4/2010 | Nanavati et al. |
| 7,748,005 B2 | 6/2010 | Romero et al. |
| 7,752,301 B1 | 7/2010 | Maiocco et al. |
| 7,756,032 B2 | 7/2010 | Feick et al. |
| 7,765,295 B2 | 7/2010 | Anastas et al. |
| 7,865,594 B1 | 1/2011 | Baumback et al. |
| 7,873,065 B1 | 1/2011 | Mukerji et al. |
| 7,904,875 B2 | 3/2011 | Hegyi |
| 7,930,393 B1 | 4/2011 | Baumback et al. |
| 7,933,988 B2 | 4/2011 | Nasuto et al. |
| 7,937,456 B2 | 5/2011 | McGrath |
| 7,961,736 B2 | 6/2011 | Ayyagari |
| 8,051,166 B1 | 11/2011 | Baumback et al. |
| 8,069,231 B2 | 11/2011 | Schran et al. |
| 8,117,306 B1 | 2/2012 | Baumback et al. |
| 8,122,124 B1 | 2/2012 | Baumback et al. |
| 8,286,176 B1 | 10/2012 | Baumback et al. |
| 8,296,429 B2 | 10/2012 | Baumback et al. |
| 8,316,124 B1 | 11/2012 | Baumback et al. |
| 8,452,870 B2 | 5/2013 | Baumback et al. |
| 8,489,737 B2 | 7/2013 | Baumback et al. |
| 8,634,673 B1 * | 1/2014 | McDougal et al. ........ 382/274 |
| 8,667,127 B2 | 3/2014 | Bettis et al. |
| 8,843,625 B2 | 9/2014 | Baumback et al. |
| 9,071,502 B2 | 6/2015 | Baumback et al. |
| 9,088,460 B2 | 7/2015 | Baumback et al. |
| 9,118,543 B2 | 8/2015 | Baumback et al. |
| 9,160,641 B2 | 10/2015 | Baumback et al. |
| 9,210,099 B2 | 12/2015 | Baumback et al. |
| 2001/0034771 A1 | 10/2001 | Hutsch et al. |
| 2002/0016802 A1 | 2/2002 | Hodgkinson |
| 2002/0062372 A1 | 5/2002 | Hong et al. |
| 2002/0099829 A1 | 7/2002 | Richards et al. |
| 2002/0107913 A1 | 8/2002 | Rivera et al. |
| 2002/0112049 A1 | 8/2002 | Elnozahy et al. |
| 2002/0116491 A1 | 8/2002 | Boyd et al. |
| 2002/0120666 A1 | 8/2002 | Landsman et al. |
| 2002/0135611 A1 | 9/2002 | Deosaran et al. |
| 2002/0138443 A1 | 9/2002 | Schran et al. |
| 2002/0150276 A1 | 10/2002 | Chang |
| 2002/0156884 A1 | 10/2002 | Bertram et al. |
| 2002/0165912 A1 | 11/2002 | Wenocur et al. |
| 2002/0194382 A1 | 12/2002 | Kausik et al. |
| 2003/0005111 A1 | 1/2003 | Allan |
| 2003/0009488 A1 | 1/2003 | Hart, III |
| 2003/0037108 A1 | 2/2003 | Peiffer et al. |
| 2003/0131106 A1 | 7/2003 | Kasriel |
| 2003/0182305 A1 | 9/2003 | Balva et al. |
| 2003/0182413 A1 | 9/2003 | Allen et al. |
| 2003/0221000 A1 | 11/2003 | Cherkasova et al. |
| 2003/0236836 A1 | 12/2003 | Borthwick |
| 2004/0039794 A1 | 2/2004 | Biby et al. |
| 2004/0049541 A1 | 3/2004 | Swahn |
| 2004/0049579 A1 | 3/2004 | Ims et al. |
| 2004/0059796 A1 | 3/2004 | McLintock |
| 2004/0064293 A1 | 4/2004 | Hamilton et al. |
| 2004/0064558 A1 | 4/2004 | Miyake |
| 2004/0128538 A1 | 7/2004 | Gmuender et al. |
| 2004/0194085 A1 | 9/2004 | Beaubien et al. |
| 2004/0221034 A1 | 11/2004 | Kausik et al. |
| 2005/0021862 A1 | 1/2005 | Schroeder et al. |
| 2005/0055420 A1 | 3/2005 | Wyler |
| 2005/0076339 A1 | 4/2005 | Merril et al. |
| 2005/0086645 A1 | 4/2005 | Diao et al. |
| 2005/0091612 A1 | 4/2005 | Stabb et al. |
| 2005/0102683 A1 | 5/2005 | Branson et al. |
| 2005/0198571 A1 | 9/2005 | Kramer et al. |
| 2005/0223091 A1 | 10/2005 | Zahavi et al. |
| 2005/0223092 A1 | 10/2005 | Sapiro et al. |
| 2005/0229119 A1 | 10/2005 | Torvinen |
| 2005/0273507 A1 | 12/2005 | Yan et al. |
| 2005/0285947 A1 * | 12/2005 | Grindstaff et al. .......... 348/208.4 |
| 2006/0020715 A1 * | 1/2006 | Girouard et al. .............. 709/246 |
| 2006/0026275 A1 | 2/2006 | Gilmour et al. |
| 2006/0059246 A1 | 3/2006 | Grove |
| 2006/0069808 A1 | 3/2006 | Mitchell et al. |
| 2006/0085536 A1 | 4/2006 | Meyer et al. |
| 2006/0179080 A1 * | 8/2006 | Meek et al. .................... 707/200 |
| 2006/0209701 A1 | 9/2006 | Zhang et al. |
| 2006/0218304 A1 | 9/2006 | Mukherjee et al. |
| 2006/0235961 A1 | 10/2006 | Klein et al. |
| 2006/0251339 A1 | 11/2006 | Gokturk et al. |
| 2006/0265497 A1 | 11/2006 | Ohata et al. |
| 2006/0282758 A1 | 12/2006 | Simons et al. |
| 2007/0016736 A1 | 1/2007 | Takeda et al. |
| 2007/0021998 A1 | 1/2007 | Laithwaite et al. |
| 2007/0050703 A1 | 3/2007 | Lebel |
| 2007/0118640 A1 | 5/2007 | Subramanian et al. |
| 2007/0198982 A1 | 8/2007 | Bolan et al. |
| 2007/0214454 A1 | 9/2007 | Edwards et al. |
| 2007/0219795 A1 | 9/2007 | Park et al. |
| 2007/0245010 A1 | 10/2007 | Arn et al. |
| 2007/0250560 A1 | 10/2007 | Wein et al. |
| 2007/0250611 A1 | 10/2007 | Bhogal et al. |
| 2007/0266151 A1 | 11/2007 | Friedland et al. |
| 2007/0271375 A1 | 11/2007 | Hwang |
| 2007/0299869 A1 | 12/2007 | Clary et al. |
| 2007/0300152 A1 | 12/2007 | Baugher |
| 2008/0065724 A1 | 3/2008 | Seed et al. |
| 2008/0065745 A1 | 3/2008 | Leighton et al. |
| 2008/0086559 A1 | 4/2008 | Davis et al. |
| 2008/0114875 A1 | 5/2008 | Anastas et al. |
| 2008/0172488 A1 | 7/2008 | Jawahar et al. |
| 2008/0183672 A1 | 7/2008 | Canon et al. |
| 2008/0183721 A1 | 7/2008 | Bhogal et al. |
| 2008/0215755 A1 | 9/2008 | Farber et al. |
| 2008/0228574 A1 | 9/2008 | Stewart et al. |
| 2008/0250327 A1 | 10/2008 | Li et al. |
| 2009/0037517 A1 | 2/2009 | Frei |
| 2009/0083228 A1 | 3/2009 | Shatz et al. |
| 2009/0089448 A1 | 4/2009 | Sze et al. |
| 2009/0122714 A1 | 5/2009 | Kato |
| 2009/0187575 A1 | 7/2009 | DaCosta |
| 2009/0248786 A1 | 10/2009 | Richardson et al. |
| 2009/0248852 A1 | 10/2009 | Fuhrmann et al. |
| 2009/0248893 A1 | 10/2009 | Richardson et al. |
| 2009/0319636 A1 | 12/2009 | Tokumi |
| 2009/0327517 A1 | 12/2009 | Sivasubramanian et al. |

(56) References Cited

U.S. PATENT DOCUMENTS

| | | |
|---|---|---|
| 2009/0327914 A1 | 12/2009 | Adar et al. |
| 2010/0034470 A1* | 2/2010 | Valencia-Campo et al. .. 382/218 |
| 2010/0061461 A1* | 3/2010 | Bankoski et al. ........ 375/240.16 |
| 2010/0318508 A1 | 12/2010 | Brawer et al. |
| 2011/0096987 A1 | 4/2011 | Morales et al. |
| 2011/0145715 A1 | 6/2011 | Malloy et al. |
| 2012/0042277 A1 | 2/2012 | Lin-Hendel |
| 2014/0129707 A1 | 5/2014 | Baumback et al. |
| 2014/0143320 A1 | 5/2014 | Sivasubramanian et al. |
| 2014/0257891 A1 | 9/2014 | Richardson et al. |
| 2014/0304406 A1 | 10/2014 | Baumback et al. |
| 2015/0012649 A1 | 1/2015 | Baumback et al. |
| 2015/0263927 A1 | 9/2015 | Baumback et al. |
| 2015/0326491 A1 | 11/2015 | Baumback et al. |
| 2015/0358250 A1 | 12/2015 | Baumback et al. |
| 2016/0020972 A1 | 1/2016 | Baumback et al. |
| 2016/0057072 A1 | 2/2016 | Baumback et al. |

OTHER PUBLICATIONS

Bennami, M., et al., Resource Allocation for Autonomic Data Centers Using Analytic Performance Models, 2005, IEEE, 12 pages.

Chang, F., et al., Automatic Configuration and Run-time Adaptation of Distributed Applications, 2000, IEEE, 10 pages.

Kounev, S., et al., Autonomic QoS-Aware Resource Management in Grid Computing Using Online Performance Models, 2007, ICST, Valuetools, 2007, 10 pages.

Office Action in Canadian Application No. 2784699 dated Apr. 28, 2014.

* cited by examiner

MONITORING WEB SITE CONTENT

CROSS-REFERENCE TO RELATED APPLICATIONS

This application is a continuation of U.S. patent application Ser. No. 13/006,281, now U.S. Pat. No. 8,667,127, entitled "MONITORING WEB SITE CONTENT" and filed on Jan. 13, 2011, which in turn is a continuation of U.S. patent application Ser. No. 12/410,251, now U.S. Pat. No. 7,917,618, entitled "MONITORING WEB SITE CONTENT" and filed on Mar. 24, 2009, the disclosures of which are incorporated herein by reference.

BACKGROUND

Generally described, computing devices and communication networks may be utilized to exchange information. In a common application, a computing device may request content from another computing device via a communication network. For example, a user at a personal computing device may utilize a browser application to request a web page from a server computing device via the Internet. In such embodiments, the user computing device may be referred to as a client computing device and the server computing device may be referred to as a content provider.

Content providers are generally motivated to provide requested content to client computing devices often with consideration of efficient transmission of the requested content to the client computing device and/or consideration of a cost associated with the transmission of the content. Additionally, the content requested by the client computing devices may have a number of components, which may require further consideration of latencies associated with delivery of the individual components as well as the originally requested content as a whole. Even further, content providers are also desirous of providing content without errors or with minimal errors such that the content renders as expected.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices, such as a browser application, typically processes embedded resource identifiers to generate requests for the content. Often the resource identifiers associated with the embedded resource reference a computing device associated with the content provider such that the client computing device would transmit the request for the additional resources to the referenced computing devices. Accordingly, in order to satisfy a content request, the content provider(s) (or any service provider on behalf of the content provider(s)) would provide client computing devices data associated with the Web page and/or data associated with the embedded resources.

Traditionally, a number of methodologies exist which measure the performance associated with the exchange of data and the functioning of the underlying software in the environment described above. For example, some methodologies provide for limited measurement of performance metrics associated with network side processing of a content request. Other methodologies allow for limited measurement of performance metrics associated with the content request measured from the browser side. From either or both of the foregoing methodologies, implicit software failures can be monitored by observing software performance for abnormal behavior (e.g., latency monitoring). Alternatively, other methodologies measure implicit software failures by analyzing business metrics such as item order rates or number of dropped item orders. Still further, other methodologies provide for monitoring explicit software failures, such as HTTP status codes, fatal classifications from RTLS, CX fatals, and the like.

BRIEF DESCRIPTION OF THE DRAWINGS

Many of the attendant advantages and aspects of the present disclosure will become more readily appreciated as the same become better understood by reference to the following detailed description, when taken in conjunction with the accompanying drawings, wherein.

DETAILED DESCRIPTION

Generally described, the present disclosure is directed to monitoring the performance associated with rendering Web site content at client computing devices. Specifically, aspects of the disclosure will be described with regard to monitoring multiple requests by a client computing device for an original resource and a set of corresponding embedded resources (collectively, a set of resources) and determining differences in corresponding image data associated with rendered images of the set of resources. In one embodiment, an averaged reference image associated with the set of resources is determined and compared with a subsequently obtained sample image corresponding to the set of resources. In another embodiment, the average reference image is weighted prior to comparing with the subsequently obtained sample image. Image differences can then be used to assess performance associated with rendering the set of resources. Additionally, based on this performance, an alert message can be provided to a content provider. Although various aspects of the disclosure will be described with regard to illustrative examples and embodiments, one skilled in the art will appreciate that the disclosed embodiments and examples should not be construed as limiting.

Figure 1:
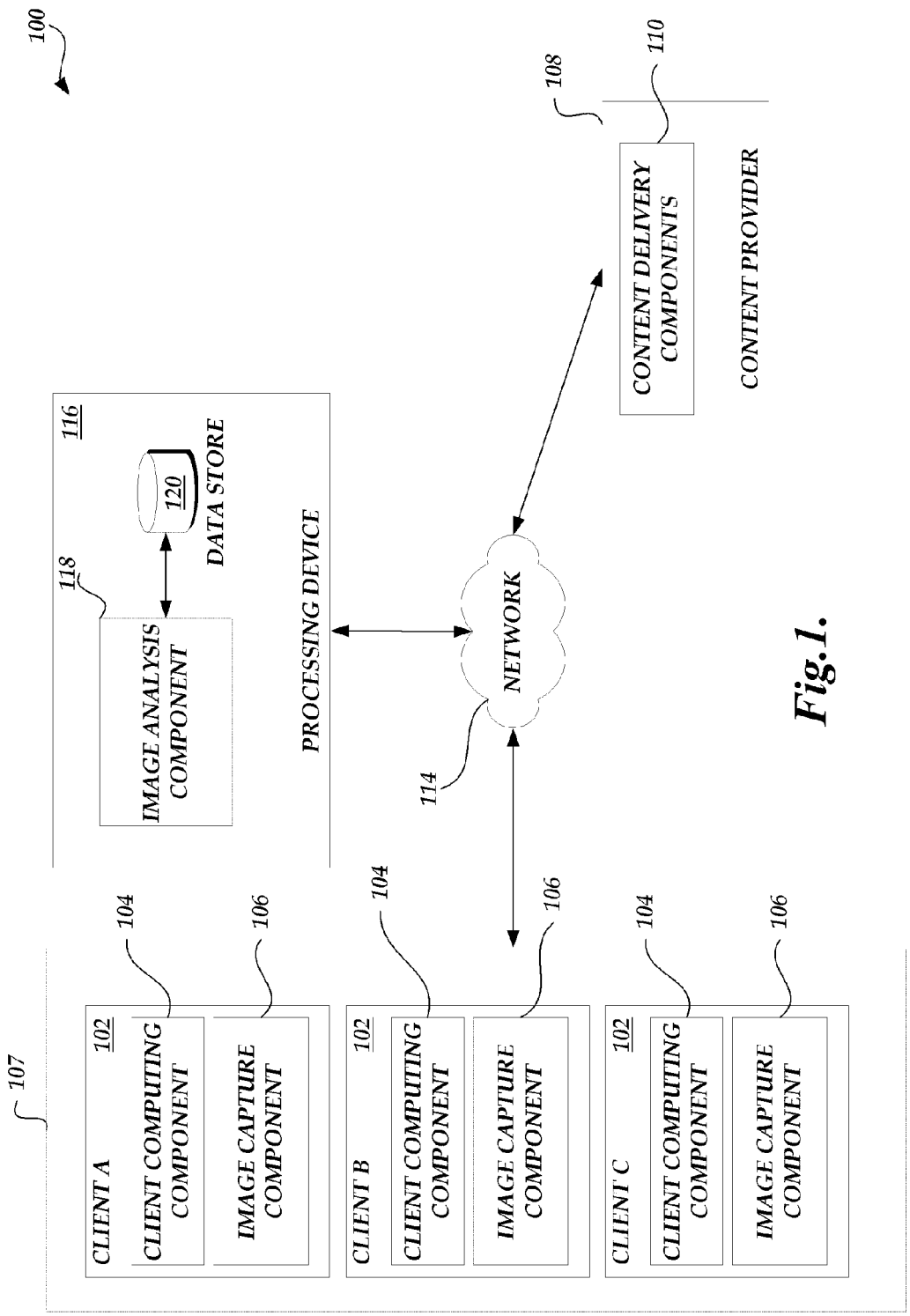
FIG. 1 is a block diagram illustrative of a Web site monitoring system including a number of client computing devices, a content provider, and a processing device.

FIG. 1 is a block diagram illustrative of a Web site monitoring system 100 for monitoring the performance associated with rendering Web site content. As illustrated in FIG. 1, the Web site monitoring system 100 includes a number of client computing devices 102 (generally referred to as clients) for requesting content from a content provider. As illustrated in FIG. 1, each client computing device 102 includes a client computing component 104 for requesting content from network resources in the form of an originally requested resource that may include identifiers to two or more embedded resources that need to be requested. Additionally, as will be further explained below, the client computing device 102 may include an image capture component 106 that generates an image of the content rendered by the client computing component.

As illustrated in FIG. 1, the client computing component 104 and image capture component 106 are executed on each client computing device 102. In another embodiment, the client computing component 104 may function in conjunction with a separate communication software application (e.g., a browser software application) to provide the combined functionality described for the client computing component 104. For example, the client computing component could correspond to a stand alone software application, plug-in, script, and the like. Additionally, although each client computing device 102 is illustrated as having a separate image capture component 106, in an alternative embodiment, the image capture component 106 may be shared by one or more client computing devices.

In an illustrative embodiment, the client computing devices 102 may correspond to a wide variety of computing devices including personal computing devices, laptop computing devices, hand-held computing devices, terminal computing devices, mobile devices, wireless devices, various electronic devices and appliances and the like. As also illustrated in FIG. 1, the client computing devices 102 are considered to be logically grouped, as represented generally by client 107, regardless of whether the client computing devices are physically separate and geographically distributed throughout the communication network 114. In this regard, the client computing devices 102 may each communicate directly or indirectly with other computing devices over network 114, such as a wide area network or local network. Additionally, one skilled in the relevant art will appreciate that client 107 can be associated with various additional computing devices/components including, but not limited to, content and resource administrative components, DNS resolvers, scheduling devices/components, and the like.

Each of the client computing devices 102 can accordingly include necessary hardware and software components for establishing communications over the network 114. For example, the client computing devices 102 may include networking components and additional software applications that facilitate communications via the Internet or an intranet. As previously described, the client computing device 102 may include an additional, separate browser software application. The client computing devices 102 may also be associated with, or otherwise include, other computing components, such as proxy applications, for further facilitating communications via the Internet or an intranet. As previously described, the client computing components 104 may each function as a browser software application for requesting content from a network resource. In other embodiments, the client computing devices 102 may be otherwise associated with an external proxy application, as well as any other additional software applications or software services, used in conjunction with requests for content.

With continued reference to FIG. 1 and as set forth generally above, the Web site monitoring system 100 may include a content provider 108 in communication with the one or more client computing devices 102 via the communication network 114. The content provider 108 may include a number of content delivery components 110, such as a Web server component and associated storage component corresponding to one or more server computing devices for obtaining and processing requests for content (such as Web pages) from the client computing devices 102. One skilled in the relevant art will appreciate that the content provider 108 can include or otherwise be associated with various additional computing resources, including, but not limited to, additional computing devices for administration of content and resources, DNS name servers, interfaces for obtaining externally provided content (e.g., advertisements, Web services, etc.), and the like. Although the Web site monitoring system 100 is illustrated in a client-server configuration, one skilled in the relevant art will appreciate that the Web site monitoring system 100 may be implemented in a peer-to-peer configuration as well.

With yet further continued reference to FIG. 1, the Web site monitoring system 100 may further include a processing device 116 for analyzing image data related to the processing of client requests. The processing device 116 can also be used to analyze the image data and to determine if an alert message and/or modifications to the original resource and/or embedded resources should be made to improve performance for subsequent client requests for the corresponding content associated with the original resource and/or embedded resources.

As illustrated in FIG. 1, the processing device 116 is in communication with the one or more client computing devices 102 and the content provider 108 via communication network 114. Additionally, as will be further described below, the processing device 116 may include a processing component, such as an image analysis component 118, for the analysis of image data from the client computing devices 102 and the assessment of whether to provide alert messages. The processing device 116 may further include a local data store 120 for storing image data, such as averaged reference images, sample images, weight maps, and the like, as will be further described below. It will be appreciated by one skilled in the art and others that image analysis component 118 and data store 120 may correspond to multiple devices/components and/or may be distributed.

In further reference to FIG. 1, the Web site monitoring system 100 can include a number of service providers, other than the content provider 108, for use in hosting, processing, or enabling the transmission of content. Moreover, it will be appreciated by one skilled in the relevant art that a service provider may offer any one or more services associated with CDN, storage, application, and transit service providers. For example, a data center may provide both traditional storage services, as well as network computing services. For purposes of simplicity, the present description will simple reference content as being provided by the content provider 108.

One skilled in the relevant art will also appreciate that the components and configurations provided in FIG. 1 are illustrative in nature. Accordingly, additional or alternative components and/or configurations, especially regarding additional components, systems and subsystems for facilitating communications may be utilized.

Figure 2:
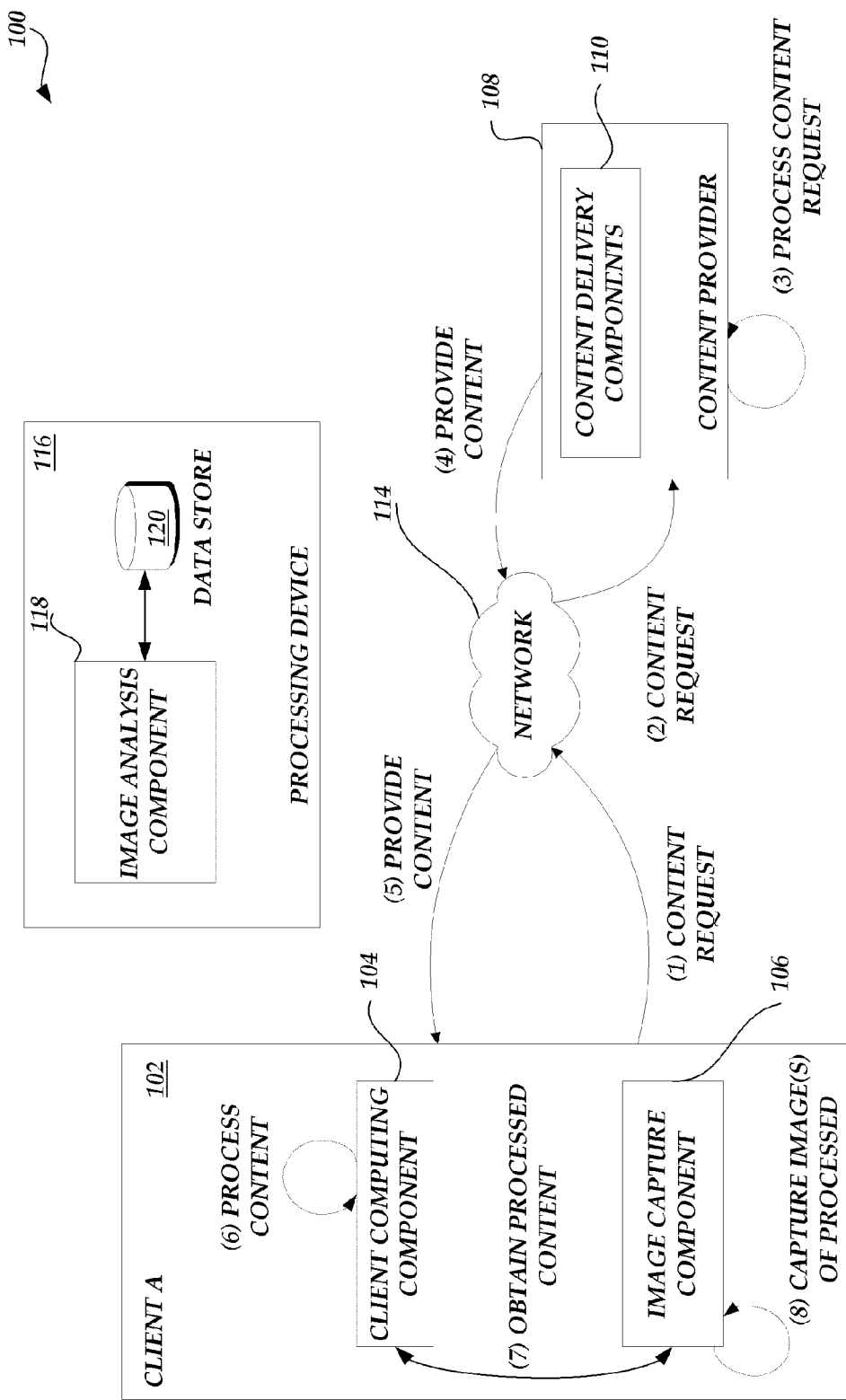
FIG. 2 is a block diagram of the Web site monitoring system of FIG. 1 illustrating the process of monitoring and fulfilling resource requests.
Figure 3:
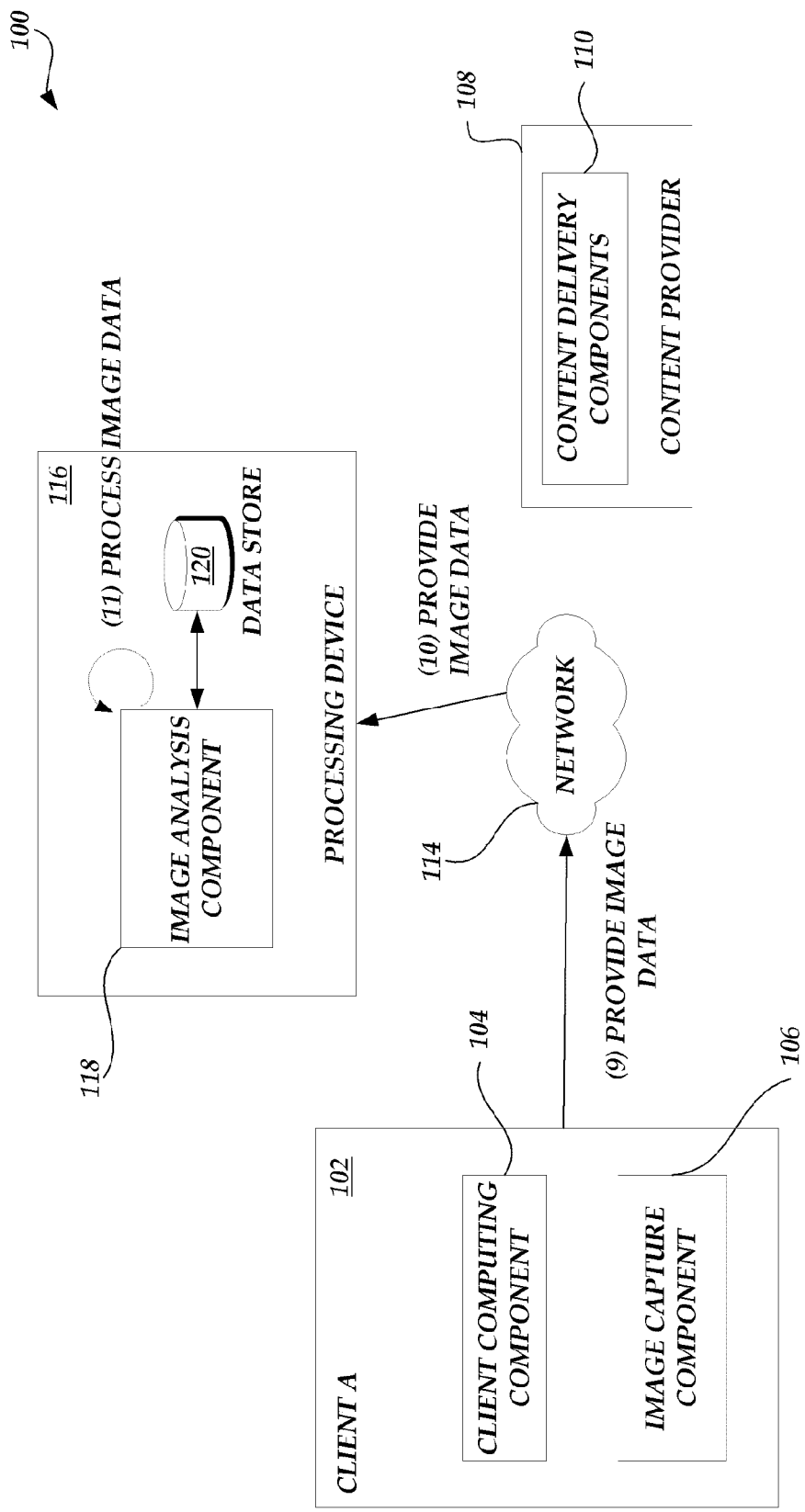
FIG. 3 is a block diagram of the Web site monitoring system of FIG. 1 illustrating the process of providing image data corresponding to rendered Web page content from a client computing device and processing the image data at a processing device.

With reference now to FIGS. 2 and 3, an illustrative example of the operation of the Web site monitoring system 100 according to some embodiments will be described. For purposes of the example, however, the illustration has been simplified such that many of the components utilized to facilitate communications are not shown. One skilled in the relevant art will appreciate that such components may be utilized and that additional interactions would accordingly occur without departing from the spirit and scope of the present disclosure.

With reference to FIG. 2, a client computing component 104 initiates a content request that is intended to ultimately be received and processed by the content provider 108. In an illustrative embodiment, the requested content may correspond to a Web page, or any portion thereof, that is displayed on the client computing device 102 via the processing of a base set of information, such as hypertext markup language ("HTML"), extensible markup language ("XML"), and the like. The base set of information may also include a number of embedded resource identifiers that corresponds to resource objects that should be obtained by the client computing device 102 as part of the processing of the requested content. The embedded resource identifiers may be generally referred to as resource identifiers or resource URLs. The request for the base set of information and the subsequent request(s) for any embedded resources, or any portion thereof, may be referred to generally as a "resource request."

In one embodiment, prior to initiating a resource request, another computing device, such as processing device 116, may be used to determine whether a test to monitor performance associated with rendering a particular resource, such as a Web page, should be conducted. In this example, the processing device 116 may send the test request, which includes a resource identifier corresponding to the desired resource request, to the client computing device 102.

In one illustrative embodiment, as shown in FIG. 2, the client computing component 104 initiates the content request by transmitting the resource identifier to the content provider 108 via communication network 114. Thereafter, the content provider 108 receives the resource request from the client computing device 102 and processes the resource request using content delivery components 110, such as a Web server. As shown in FIG. 2, upon obtaining the requested resource, the content provider 108 initiates transmission of the requested resource to the client computing device 102.

As further illustrated in FIG. 2, the client computing component 104 obtains and processes the requested resource. For example, the client computing component 104 can process the requested resource for display on a monitor or other display device associated with the client computing device 102. In addition or alternatively, the client computing component 104 can process the requested resource for sending to any other component or external device (e.g., a framebuffer). For example, as illustrated in FIG. 2, the client computing component 104 can process the requested resource for sending to the image capture component 106. The image capture component 106 can then generate an image associated with rendering the requested resource. Such an image captures all visible content and effectively normalizes it into one form of data.

It will be appreciated by one skilled in the art and others that the above-described functionality of the image capture component 106 can be implemented, for example, by a separate stand-alone component as part of functionality provided by the operating system of the client computing device 102 (e.g., a driver loaded on the operating system), or a component being executed on a graphics card associated with the client computing device for providing a screen image capture to a separate file.

With reference now to FIG. 3, the image capture component 106 of the client computing device 102 provides the generated image data associated with the requested resource to the image analysis component 118 of the processing device 116 via the communication network 114. The image analysis component 118 then processes the received image data.

In one embodiment, and as will be further described below, the received image data can correspond to a first reference image associated with the requested resource. The image analysis component 118 can store the first reference image in local data store 120, or any other data store distributed across the network 114 for later use, such as after further reference images associated with the requested resource are obtained. For example, as similarly set forth above, prior to the client computing device 102 initiating a resource request, the processing device 116 can send a test request, which includes a resource identifier corresponding to the desired resource request as well as the number of times the resource should be requested to generate separate sets of reference image data, to the client computing device 102. In accordance with this embodiment, where the number of initial resource requests to be made by the client computing device is two, the client computing device 102 initiates two requests for the same resource and generates two sets of reference image data as similarly described in reference to FIG. 2. Accordingly, in this example, the processing device 116 receives both a first reference image and a second reference image from the image capture component 106. As will be further described below, the image analysis component 118 then determines an averaged reference image based on the first and second reference images.

In some embodiments, the image analysis component 118 can then also generate a weight map based on the first and second reference images. For example, as will also be described further below, the weight map can include a weighted pixel value for each pixel corresponding to the respective pixels in the first and second reference images. The image analysis component 118 can store the reference images and weight map in local data store 120, or any other data store distributed across the network 114 for later use.

In accordance with another embodiment, and as will be further described below, the generated image data received at the image analysis component 118 from the image capture component 106 of the client computing device as shown in FIG. 3 can correspond to a sample image associated with the requested resource. A sample image associated with the requested resource can be generated after the processing device has generated a corresponding averaged reference image. In one example, after the averaged reference image is generated, the processing device 116 can initiate a further test request for the client computing device 102 to commence further resource requests for the same content in order to generate sample image data that can be compared to the averaged reference image data. Alternatively, such further test request can be a part of the initial test request described above and may indicate a time for subsequently initiating the requests to generate the sample image data.

As will be further described below, after receiving sample image data from the image capture component 106, the image analysis component 118 of the processing device 118 can compare the sample image with the corresponding averaged reference image to automatically determine whether any content rendering errors or inconsistencies exist. The processed sample image can accordingly be used to support modifications to the original resource and/or embedded resources to improve performance for subsequent client requests for the original resource. If necessary, as will be further described below in reference to FIGS. 6A-6C, the processing device 116 can cause the display of the averaged reference image, the sample image, and any inconsistencies, respectively, to a user of the system 100 for further assessment. In addition or alternatively, the image analysis component 118 can also then transmit an alert message to the content provider 108 identifying any such errors or inconsistencies related to the processing of the client request for the original resource and any embedded resources.

Figure 4:
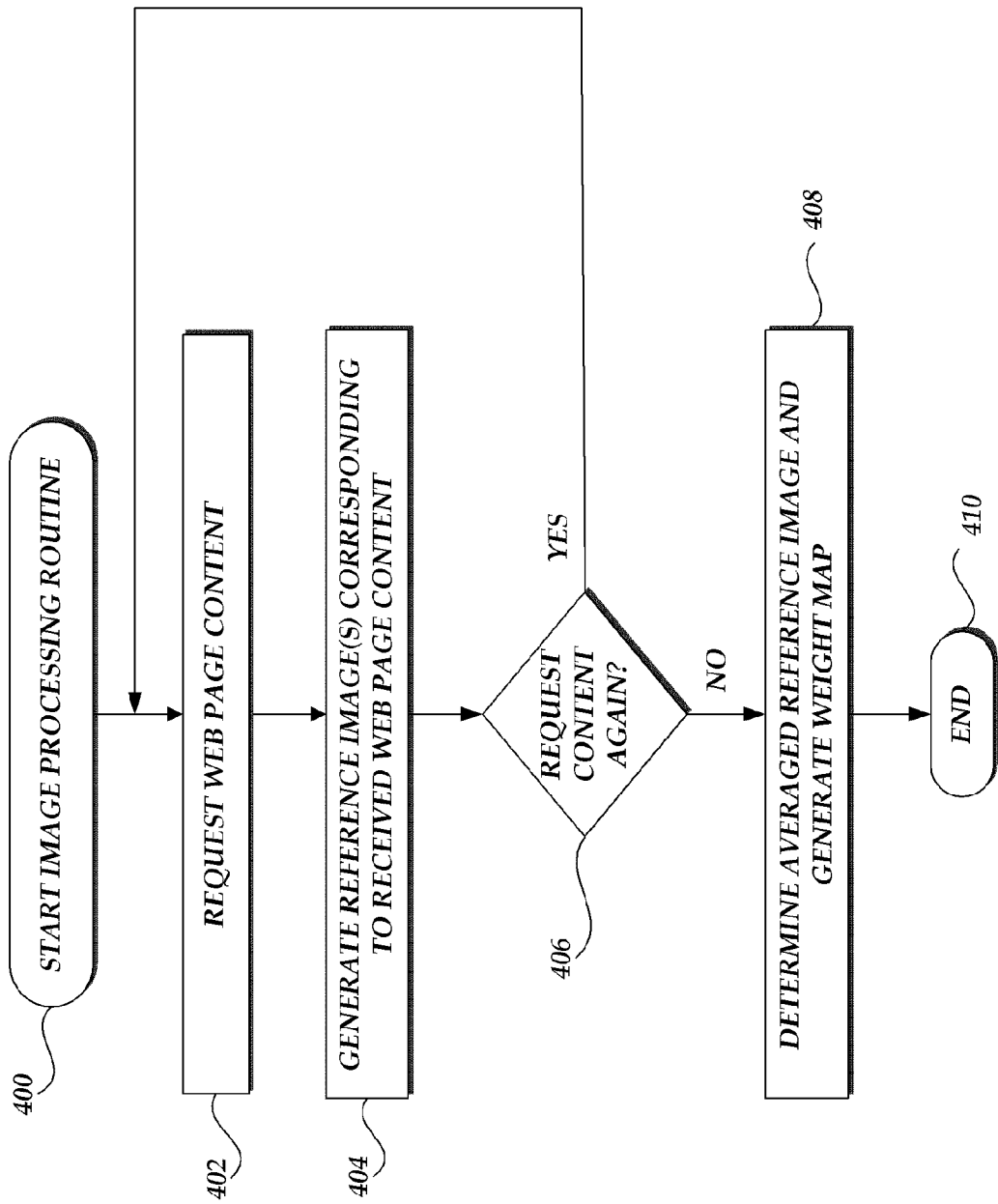
FIG. 4 is a flowchart illustrative of an image processing routine implemented by the Web site monitoring system for processing reference image data associated with a set of requested resources rendered by the client computing device.

With reference now to FIG. 4, one embodiment of an image processing routine 400 implemented by the Web site monitoring system 100 will be described. One skilled in the relevant art will appreciate that actions/steps outlined for routine 400 may be implemented by one or many computing devices/components that are associated with Web site monitoring system 100. Accordingly, routine 400 has been logically associated as being generally performed by the Web site monitoring system 100, and thus the following illustrative embodiments should not be construed as limiting.

At block 402, a client computing component 104 identifies a first resource request associated with a first resource identifier and requests the corresponding set of resources. As previously mentioned, the client computing component 104 can generate the first resource request or receive the first resource request from another computing device, such as processing device 116. In one example, the first resource request associated with the first resource identifier may be for a Web page, such as http://example.com. At block 404, an image capture component 106 of the client computing device 102 generates a first reference image corresponding to a first rendering of the set of resources associated with the first resource request. The first reference image includes a pixel intensity value for each pixel in the first reference image. Essentially, the first reference image captures all visible content and effectively normalizes into one form of data.

Next, at a block 406, a test is performed by the client computing component 104 to determine whether another resource request associated with the first resource identifier should be initiated. The client computing component can make this determination itself, based on new instructions received from another computing device, such as processing device 116, or based on prior instructions from another computing device, such as processing device 116.

If the client computing component 104 determines that a second resource request associated with the first resource identifier should be initiated at block 406, processing returns to block 402 where the foregoing described functionality is repeated until no resource requests are outstanding. In particular, the client computing component 102 transmits a second resource request associated with the first resource identifier. In response, the image capture component 106 of the client computing device 102 then generates a second reference image corresponding to a second rendering of the set of resources corresponding to the first resource identifier. The second reference image similarly includes a pixel intensity value for each pixel in the second reference image. Then, another test is made at block 406 to determine whether yet another resource request associated with the first resource identifier (e.g., uniform resource locator corresponding to a particular Web page) should be initiated.

If at block 406, the client computing component 104 determines that no additional resource requests should be initiated, processing continues at block 408 where the image analysis component 118 of the processing device 116 determines an averaged reference image based on the prior reference images generated by and obtained from the client computing device 102. In one example, where the image analysis component obtains two reference images, the image analysis component 118 determines the averaged reference image by averaging the pixel intensity value for each pixel in the first reference image with the pixel intensity value for each pixel in the second reference image.

Additionally, at block 408, the image analysis component 118 may optionally an image weight map based on the obtained reference images. The image weight map includes a weighted pixel value for each pixel corresponding to the respective pixels in the reference images. The image analysis component 118 determines the weighted pixel values based on the difference of the corresponding pixel intensity value between the obtained reference images. For example, the image analysis component 118 may determine that a given pixel corresponds to static content if it remains constant between the obtained reference images and to more dynamic content if it does not. The image analysis component 118 may weight static pixel content greater than dynamic pixel content. In one embodiment, the weight map may be a binary weight map. In this instance, static pixel content may be given a value of 1, while dynamic pixel content may be given a value of 0. Although not illustrated in FIG. 4, the image analysis component 118 can store the averaged reference image and any corresponding generated weight map in the data store 120 for future use as will be described below. The routine 400 ends at block 410.

It will be appreciated by one skilled in the art and others that while the functionality associated with blocks 404 and 408 is described above as being implemented by the image capture component 106 of the client computing device 102 and the image analysis component 118 of the processing device 116, respectively, the combined functionality may be implemented by a single processing component of either the client computing device 102 or the processing device 116. In addition, such single processing component may also provide the instructions to the client computing component regarding initiation of the resource requests.

Figure 5:
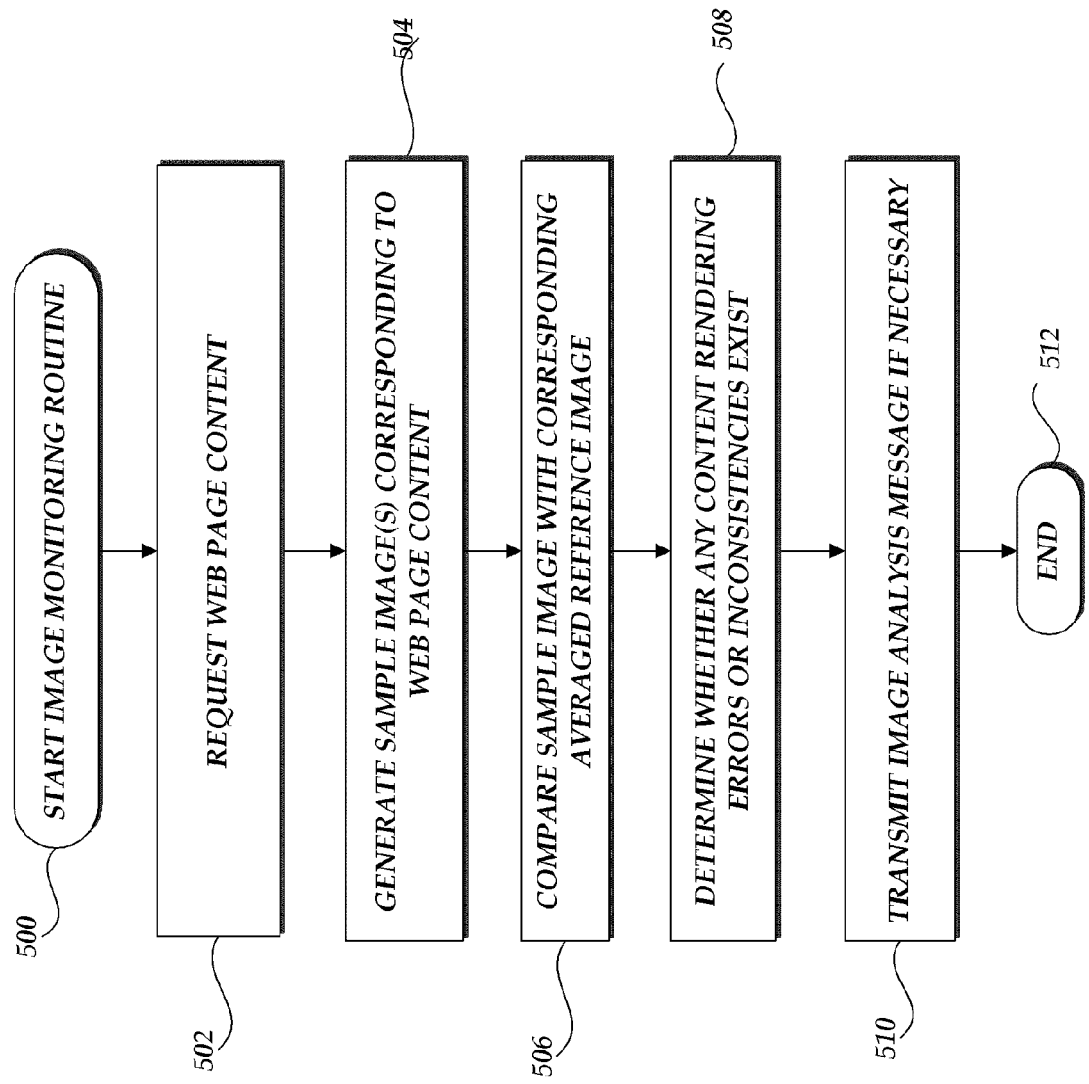
FIG. 5 is a flowchart illustrative of an image monitoring routine implemented by an image analysis component of the Web site monitoring system for monitoring performance associated with the set of requested resources rendered in accordance with a further request for the set of resources.

With reference now to FIG. 5, one embodiment of an image monitoring routine 500 implemented by the Web site monitoring system 100 will be described. One skilled in the relevant art will appreciate that actions/steps outlined for routine 500 may be implemented by one or many computing devices/components that are associated with the Web site monitoring system 100. Accordingly, routine 500 has been logically associated as being generally performed by the Web site monitoring system 100, and thus the following illustrative embodiments should not be construed as limiting.

At block 502, a client computing component 104 identifies another resource request associated with the first resource identifier and requests the corresponding set of resources. As previously mentioned, the client computing component 104 can generate the additional resource request or receive the additional resource request from another computing device, such as processing device 116. In one embodiment, this additional resource request is generated after the Web site monitoring system has generated the averaged reference image associated with the first resource identifier as described in reference to FIG. 4. At block 504, an image capture component 106 of the client computing device 102 generates a sample image corresponding to an additional rendering of the set of resources associated with the additional resource request of block 502. Similar to the reference images, the sample image includes a pixel intensity value for each pixel in the first reference image. Essentially, the sample image also captures all visible content and effectively normalizes into one form of data.

Continuing at block 506, the image analysis component 118 of the processing device 116 processes the sample image generated by and obtained from the client computing device 102. In particular, the image analysis component 118 compares the sample image with the averaged reference image corresponding to the same set of requested resources in order to identify a compared image. In one embodiment, the resulting compared image includes an intensity value for each pixel of the compared image corresponding to the difference between the corresponding pixel in sample image and the averaged reference image. Accordingly, in one illustrative embodiment, pixels in the compared image with a value of 0 or a value which does not exceed an individual pixel threshold value are determined to have remained essentially static. However, pixels with a value exceeding the individual pixel threshold value are determined to be dynamic.

Next, at block 508, the image analysis component 118 automatically determines whether any content rendering errors or inconsistencies between the sample image and the corresponding averaged reference image exist. In one embodiment, the image analysis component 118 makes such a determination by first weighting the compared image using the corresponding weight map generated as described in reference to FIG. 4. Accordingly, each pixel value of the compared image is multiplied by the corresponding pixel value of the weight map. Next, the image analysis component 118 determines whether a sum of the intensity values for each pixel in the weighted compared image exceeds a threshold. In this example, if the threshold is exceeded, the image analysis component 118 determines that content rendering errors or inconsistencies between the sample image and the corresponding averaged reference image in fact exist.

Continuing at block 510, the image analysis component 118 then transmits an image analysis message if necessary. In one embodiment, an image analysis message can be transmitted to the content provider 108 responsible for the set of resources associated with the analyzed images whether or not the image analysis component 118 determines that errors or inconsistencies exist. In this example, the image analysis message simple reports all results to the content provider 108.

In another embodiment, the image analysis message can be transmitted to the content provider only in the event that the image analysis component 118 determines that errors or inconsistencies exist as determined at block 508. In this example, the image analysis message can be an alert message. The alert message can include an identification of an affected pixel area corresponding to the rendered set of resources so that a content provider can identify the underlying affected content. The affected area can be determined by the image analysis component 118 as the pixel area in which the greatest differences in pixel intensity value exist between the sample image and the averaged reference image. In addition or alternatively, the alert message can include an identification of an expected output for the affected area. In one example, this identification may be a visual display of the expected content for the affected area within a bounding box defining the affected area as illustrated in FIG. 6C. In addition or alternatively, the alert message can include an identification of a responsible entity for the content in the affected area. Moreover, the alert message may be sent directly to this responsible entity. Even further, the alert message can include other data corresponding to the rendered images associated with the set of resources, such as an identification of the Web browser used to render the images.

In another embodiment the image analysis message or alert message may additionally or alternatively be transmitted to an administrator of the Web site monitoring system for further action. The routine 500 ends at block 512.

As similarly set forth above in reference to FIG. 4, it will be appreciated by one skilled in the art and others that while the functionality associated with blocks 504 and 506-510 is described above as being implemented by the image capture component 106 of the client computing device 102 and the image analysis component 118 of the processing device 116, respectively, the combined functionality may be implemented by a single processing component of either the client computing device 102 or the processing device 116. In addition, such single processing component may also provide the instructions to the client computing component regarding initiation of the resource requests.

Figure 6A:
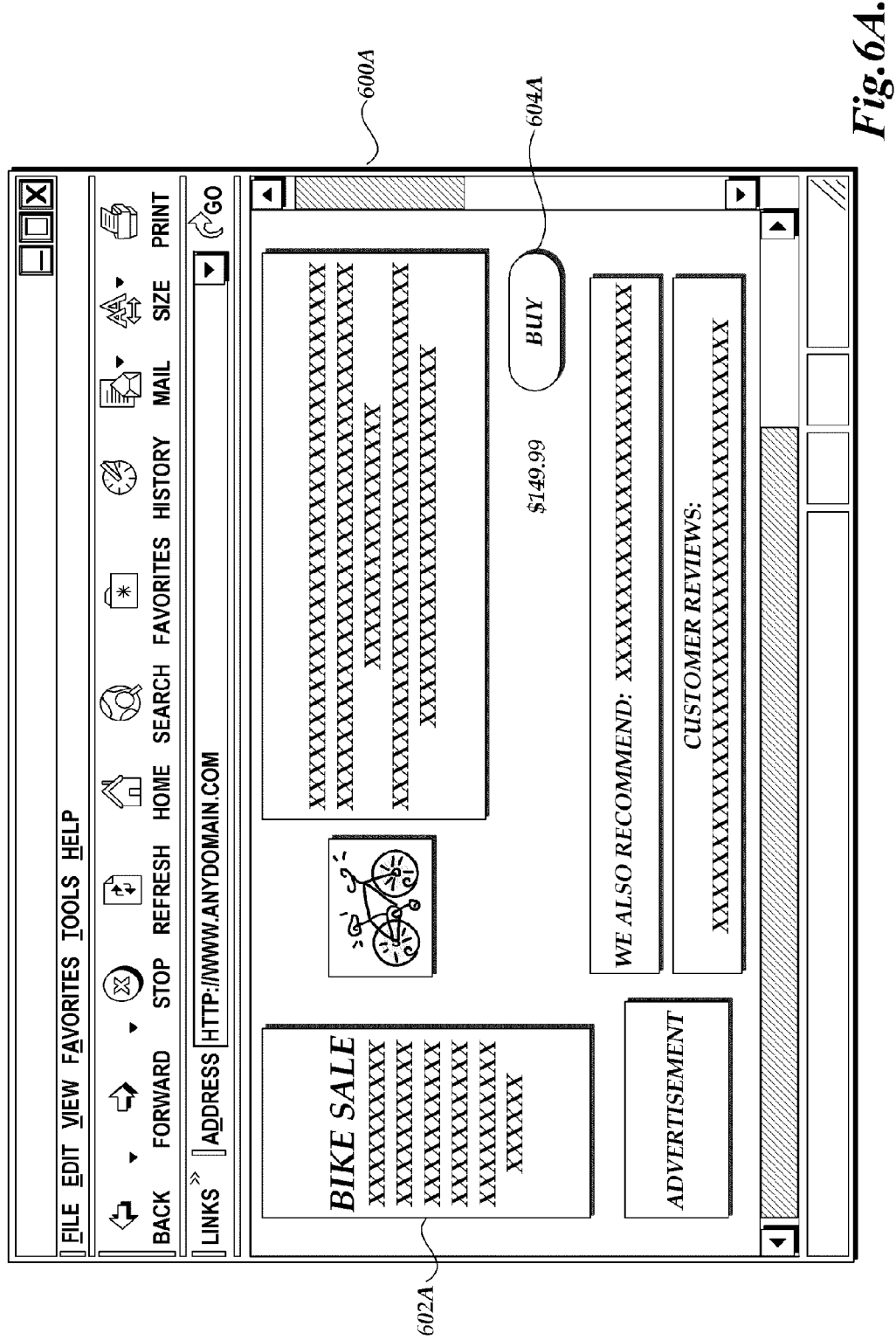
FIG. 6A is an illustrative user interface displaying an expected image corresponding to a set of requested resources.

With reference now to FIG. 6A, an illustrative user interface 600A generated by the processing device 116 for displaying an expected image corresponding to the set of resources (e.g., the content on a Web page) is provided. In one embodiment, the expected image corresponds to the averaged reference image. This user interface 600A can be provided to a content provider 108 as a part of an image analysis message or an alert message as described above. As will also be discussed further below, the user interface 600A includes a current event section 602A and a buy button 604A.

Figure 6B:
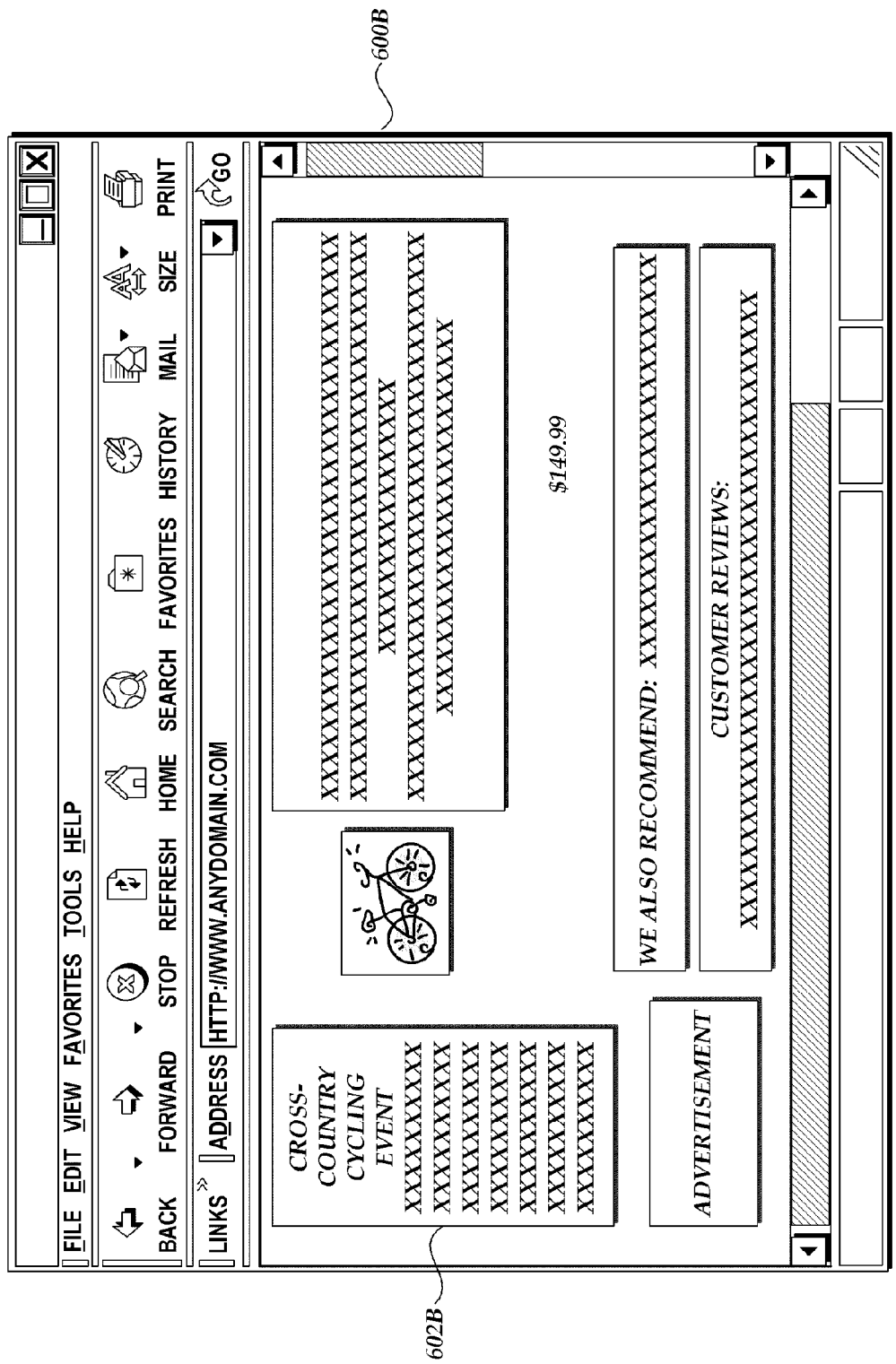
FIG. 6B is an illustrative user interface displaying a sample image corresponding to the set of requested resources rendered in accordance with a further request for the set of resources.
Figure 6C:
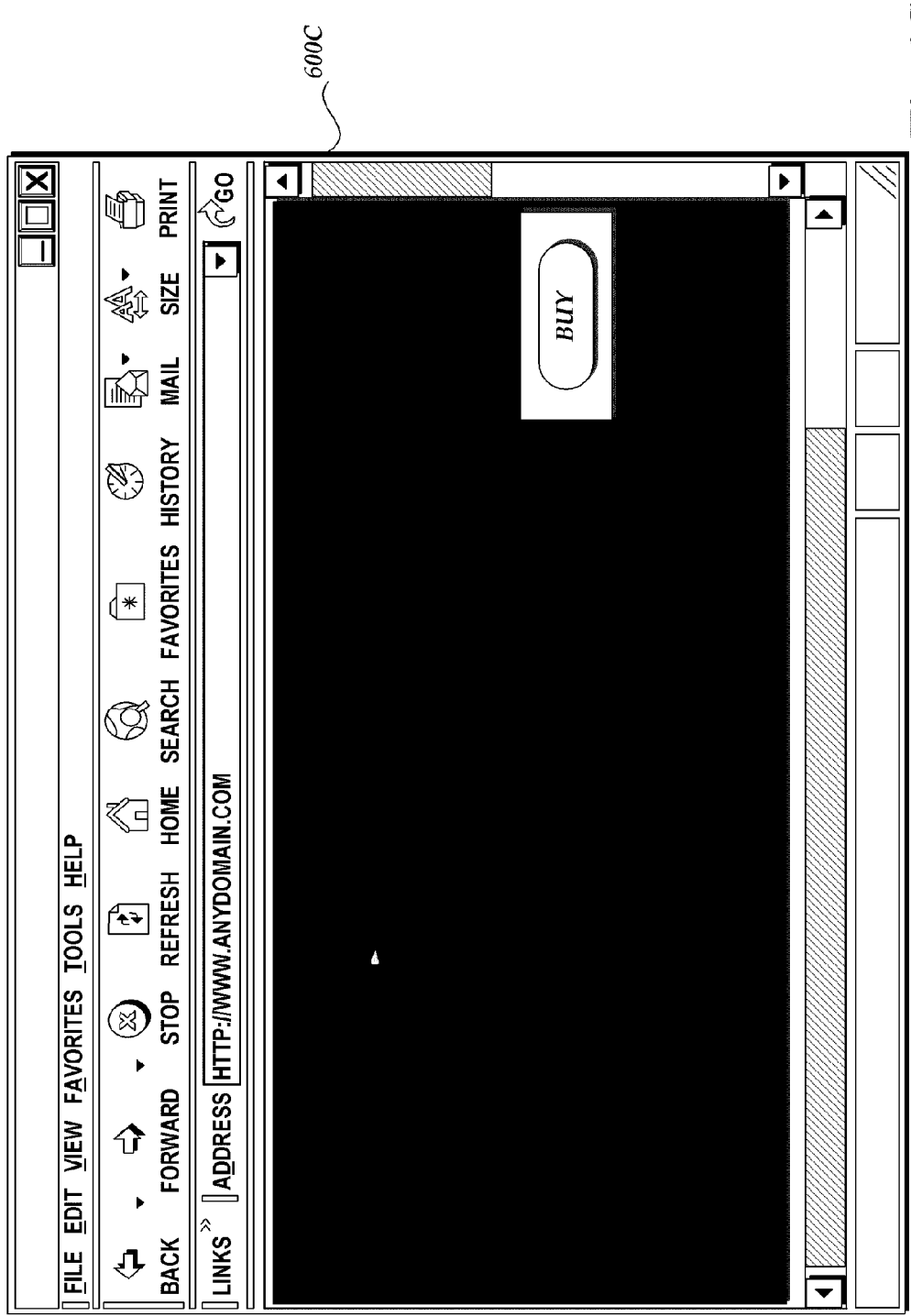
FIG. 6C is an illustrative user interface displaying an area in which the averaged reference image and the sample image differ.

With reference now to FIG. 6B, an illustrative user interface 600B generated by the processing device 116 for displaying a sample image corresponding to the set of resources (e.g., the content on a Web page) and compared against the corresponding averaged reference image is provided. This user interface 600B can be provided to a content provider 108 as a part of an image analysis message or an alert message as described above. In particular, it can be provided in conjunction with the user interface 600A as described in reference with FIG. 6A to provide a comparison to the content provider of how a Web page is currently rendering versus how it should be rendering. As shown in FIG. 6B, the sample image displayed in the user interface 600B has a different current event identified in current event section 602B. In this example, an upcoming cross-country cycling event in shown in current event section 602B, as compared to a previous bike sale as shown in current event section 602A in FIG. 6A. In addition, the sample image displayed in the user interface 600B is missing the buy button as previously displayed in FIG. 6A.

With reference now to FIG. 6C, an illustrative user interface 600C generated by the processing device 116 for displaying an affected image area corresponding to the set of resources (e.g., the content on a Web page) in which errors or inconsistencies have been found is provided. The user interface 600C illustrates a visual display of the content in the affected pixel area only. The content displayed within the bounding box defining the affected area can illustrate the expected content for that area. This user interface 600C can be provided to a content provider 108 as a part of an image analysis message or an alert message as described above. Moreover, the user interface 600C can be provided alone, or together with user interfaces 600A and 600B for further clarity.

Continuing with the foregoing example, two differences were found in a comparison of the averaged reference image in FIG. 6A and the sample image in FIG. 6B. One was a difference between the current event sections of the user interfaces, and the other difference was that the buy button was missing from the user interface in FIG. 6B. As shown in FIG. 6C, the only affected area shown is associated with the buy button. In this example, a weight map applied to an image comparison between the averaged reference image and the sample image indicated that the current event section in the reference images used to generate the averaged reference image were constantly changing over time. Accordingly, the weight map accorded a zero weight to the current event section. Accordingly, when applied to the image comparison between the averaged reference image and the sample image, the current event section was not identified as an affected area as it is expected to constantly change, whereas the buy button should remain static.

In another embodiment, the image tested through generation of reference images and one or more sample images may correspond only to the buy button area of the Web page or any other known static area of importance, rather than the entire content of the Web page.

It will be appreciated by those skilled in the art and others that while processing, monitoring, and other functions have been described herein as being performed at various components of the client computing device 102 and/or the processing device 116, these functions can be distributed across one or more computing devices. In addition, the image data and weight maps generated at the client computing device 102 and/or the processing device 116 can be maintained globally by the processing device 116 and shared with all or some subset of the components of the client computing device 102.

It will further be appreciated by those skilled in the art and others that all of the functions described in this disclosure may be embodied in software executed by one or more processors of the disclosed components. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
generating a first reference image corresponding to a first rendering of at least a portion of a set of resources, wherein the first reference image comprises a pixel intensity value for individual pixels in the first reference image;
generating a second reference image corresponding to a second rendering of the same at least a portion of the set of resources in the first rendering, wherein the second reference image comprises a pixel intensity value for individual pixels in the second reference image;
determining an image weight map including a weight for individual pixels corresponding to the respective pixels in the first and second reference images, wherein individual weights are determined based on the difference of the corresponding pixel intensity value between the first and second reference images;
generating a sample image corresponding to a third rendering of the same at least a portion of the set of resources in the first rendering, wherein the sample image comprises a pixel intensity value for individual pixels in the sample image; and
causing transmission of an alert message indicating an inconsistency in the third rendering of the same at least a portion of the set of resources in the first rendering, wherein the inconsistency is determined based, at least in part, on the image weight map and wherein the alert message includes an identification of an affected pixel area,
wherein the method is implemented by a computer system configured with specific executable instructions.

2. The computer-implemented method as recited in claim 1, wherein the set of resources corresponds to Web page content.

3. The computer-implemented method as recited in claim 1, wherein the first and second reference images are individual representations of a rendering of a portion of the Web page content.

4. The computer-implemented method as recited in claim 1, wherein the image weight map is a binary weight map.

5. The computer-implemented method as recited in claim 1, wherein the image weight map includes a plurality of weights and wherein individual weights in the weight map are based on whether the corresponding pixel intensity value in the first and second reference images is constant.

6. The computer-implemented method as recited in claim 1 further comprising:
comparing the sample image with an averaged reference image to identify a compared image, wherein the averaged reference image is determined by averaging pixel intensity values in the first reference image with pixel intensity values in the second reference image;
weighting the compared image using the image weight map to produce a weighted compared image; and
determining whether a sum of the intensity values for individual pixels in the weighted compared image exceeds a threshold.

7. The computer-implemented method as recited in claim 6, wherein the compared image includes an intensity value for individual pixels of the compared image corresponding to the difference between the sample image and the averaged reference image.

8. The computer-implemented method as recited in claim 6, wherein causing the transmission of the alert message further comprises causing transmission of the alert message if the threshold is exceeded.

9. A system comprising:
at least one computing device having specific executable instructions stored in an associated memory and operative to:

generate a first reference image corresponding to a first rendering of at least a portion of a set of resources, wherein the first reference image comprises a pixel intensity value for individual pixels in the first reference image;

generate a second reference image corresponding to a second rendering of the same at least a portion of the set of resources in the first rendering, wherein the second reference image comprises a pixel intensity value for individual pixels in the second reference image;

determine an image weight map including a weight for individual pixels corresponding to the respective pixels in the first and second reference images, wherein individual weights are determined based on the difference of the corresponding pixel intensity value between the first and second reference images;

generate a sample image corresponding to a third rendering of the same at least a portion of the set of resources in the first rendering, wherein the sample image comprises a pixel intensity value for individual pixels in the sample image; and cause transmission of an alert message indicating an inconsistency in the third rendering of the same at least a portion of the set of resources in the first rendering, wherein the inconsistency is determined based, at least in part, on the image weight map and wherein the alert message includes an identification of an affected pixel area.

10. The system as recited in claim 9, wherein the set of resources corresponds to Web page content.

11. The system as recited in claim 9, wherein the first and second reference images are individual representations of a rendering of a portion of the Web page content.

12. The system as recited in claim 9, wherein the image weight map is a binary weight map.

13. The system as recited in claim 9, wherein the image weight map includes a plurality of weights and wherein individual weights in the weight map are based on whether the corresponding pixel intensity value in the first and second reference images is constant.

14. The system as recited in claim 9, wherein the at least one computing device is further operative to:

compare the sample image with an averaged reference image to identify a compared image, wherein the averaged reference image is determined by averaging pixel intensity values in the first reference image with pixel intensity values in the second reference image;

weight the compared image using the image weight map to produce a weighted compared image; and determine whether a sum of the intensity values for individual pixels in the weighted compared image exceeds a threshold.

15. The system as recited in claim 14, the compared image includes an intensity value for individual pixels of the compared image corresponding to the difference between the sample image and the averaged reference image.

16. The system as recited in claim 14, wherein causing the transmission of the alert message further comprises causing transmission of the alert message if the threshold is exceeded.

17. Computer-readable non-transitory storage including computer-executable instructions that, when executed by a processor, cause the processor to at least:

generate a first reference image corresponding to a first rendering of at least a portion of a set of resources, wherein the first reference image comprises a pixel intensity value for individual pixels in the first reference image;

generate a second reference image corresponding to a second rendering of the same at least a portion of the set of resources in the first rendering, wherein the second reference image comprises a pixel intensity value for individual pixels in the second reference image;

determine an image weight map including a weight for individual pixels corresponding to the respective pixels in the first and second reference images, wherein individual weights are determined based on the difference of the corresponding pixel intensity value between the first and second reference images;

generate a sample image corresponding to a third rendering of the same at least a portion of the set of resources in the first rendering, wherein the sample image comprises a pixel intensity value for individual pixels in the sample image; and cause transmission of an alert message indicating an inconsistency in the third rendering of the same at least a portion of the set of resources in the first rendering, wherein the inconsistency is determined based, at least in part, on the image weight map and wherein the alert message includes an identification of an affected pixel area.

18. The computer-readable non-transitory storage as recited in claim 17, wherein the set of resources corresponds to Web page content.

19. The computer-readable non-transitory storage as recited in claim 18, wherein the first and second reference images are individual representations of a rendering of a portion of the Web page content.

* * * * *